(12) United States Patent
Yan et al.

(10) Patent No.: US 11,071,404 B2
(45) Date of Patent: Jul. 27, 2021

(54) METHOD FOR ADJUSTING THE HEATING POWER OF AT LEAST ONE HEATING ELEMENT OF A DOMESTIC APPLIANCE

(71) Applicant: Vorwerk & Co. Interholding GmbH, Wuppertal (DE)

(72) Inventors: Wenjie Yan, Düsseldorf (DE); Torsten Lang, Solingen (DE); Christiane Stach, Radevormwald (DE); Stefan Kraut-Reinkober, Leverkusen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 312 days.

(21) Appl. No.: 16/189,623

(22) Filed: Nov. 13, 2018

(65) Prior Publication Data
US 2019/0142206 A1 May 16, 2019

(30) Foreign Application Priority Data

Nov. 14, 2017 (EP) .................................. 17201487
Mar. 23, 2018 (EP) .................................. 18163558

(51) Int. Cl.
*H05B 1/02* (2006.01)
*A47J 27/00* (2006.01)
(Continued)

(52) U.S. Cl.
CPC ............ *A47J 27/004* (2013.01); *A47J 36/32* (2013.01); *A47J 43/046* (2013.01); *A47J 44/00* (2013.01); *G05D 23/1919* (2013.01)

(58) Field of Classification Search
CPC ........ A47J 27/004; A47J 36/32; A47J 43/046; A47J 44/00; G04D 23/1919; H05B 1/02;
(Continued)

(56) References Cited

U.S. PATENT DOCUMENTS 5,575,194 A    11/1996  Maher, Jr. et al.
10,721,948 B1 * 7/2020  Swayne ............ A23C 19/0912
(Continued)

FOREIGN PATENT DOCUMENTS

CN    101855498 A    10/2010
CN    102637053 A    8/2012
(Continued)

OTHER PUBLICATIONS

First Office Action for Chinese Application No. 201811351237.9 dated Apr. 1, 2020, with its English translation, 12 pages.

*Primary Examiner* — Mark H Paschall
(74) *Attorney, Agent, or Firm* — Rudy J. Ng; Bret E. Field; Bozicevic, Field & Francis LLP (57) ABSTRACT

The invention relates to a method (100) for adjusting the heating power of at least one heating element (40) of a domestic appliance (10), wherein the domestic appliance (10) includes a temperature sensor (50) for measuring a temperature (T) in a receiving space (20) of the domestic appliance (10).
The following steps are provided:
  a) performing a heat-up stage (A) with a heating power adjustment such that the temperature (T) aims toward a predetermined target temperature (S),
  b) performing a temperature-holding stage (B) once the temperature (T) reached the target temperature (S), wherein a limitation of the heating power is effected in the temperature-holding stage (B),
  c) performing at least one assessment of the temperature (T) using the target temperature (S) during the temperature-holding stage (B), so that an evaluation result is determined,
  d) performing of a stabilization stage (C), if the evaluation result meets a stabilization criterion, wherein in the stabilization stage (C), the heating power adjustment is
(Continued)

effected in such a way that the temperature (T) aims toward a certain stabilization temperature (ST), wherein the stabilization temperature (ST) is higher than the target temperature (S).

16 Claims, 3 Drawing Sheets

(51) Int. Cl.
*A47J 44/00* (2006.01)
*A47J 36/32* (2006.01)
*A47J 43/046* (2006.01)
*G05D 23/19* (2006.01)

(58) Field of Classification Search
CPC ... H05B 1/0261; H05B 1/0269; H05B 3/0076
USPC ........ 219/505, 494, 497, 492, 446.1, 448.11, 219/702, 710, 712, 719
See application file for complete search history.

(56) References Cited

U.S. PATENT DOCUMENTS

| | | | |
|---|---|---|---|
| 10,842,310 B2* | 11/2020 | Kitatani | A47J 37/0629 |
| 2003/0015518 A1* | 1/2003 | Baker | F24C 7/087 219/486 |
| 2011/0220636 A1* | 9/2011 | Hendricks | H05B 1/0252 219/494 |
| 2018/0004271 A1* | 1/2018 | Knappenberger | H04B 1/1615 |

FOREIGN PATENT DOCUMENTS

| | | |
|---|---|---|
| CN | 102985799 A | 3/2013 |
| CN | 104075371 A | 10/2014 |
| CN | 106304453 A | 1/2017 |
| CN | 107124780 A | 9/2017 |
| DE | 102010000299 A1 | 8/2011 |
| DE | 102010037769 A1 | 3/2012 |
| EP | 2388564 A1 | 11/2011 |
| FR | 2996434 A1 | 4/2014 |
| GB | 2431784 A | 5/2007 |
| JP | S61191322 A | 8/1986 |
| JP | H07168632 A | 7/1995 |

* cited by examiner

METHOD FOR ADJUSTING THE HEATING POWER OF AT LEAST ONE HEATING ELEMENT OF A DOMESTIC APPLIANCE

The present invention relates to a method for adjusting the heating power of at least one heating element of a domestic appliance. The invention further relates to a system, a domestic appliance, as well as a computer program product.

It is known from the prior art that in domestic appliances, and in particular food processors, food is heated while being prepared manually or by means of the domestic appliance. For example, the heating can be effected during operation of a mixer, e.g. during a mixing process, in a soup or the like. In this case, the target temperature to which the medium in the receiving space, in particular mixing vessel, is to be heated is usually set by a user of the domestic appliance. To that end, a heating regulation can be performed in a heating element of the domestic appliance, which uses a measured temperature, e.g. in a mixing vessel, as the controlled process variable. For example, an electric temperature sensor, e.g. a temperature-dependent resistor, is used to detect the temperature.

An important technical challenge in such applications lies with the fact that such a temperature sensor can measure only a local temperature that deviates from the actual temperature of the medium. The temperature sensor is, for example, embedded in a (mixing vessel) bottom, and is therefore not in direct contact with the medium (in the mixing vessel), i.e. the prepared food. Another difficulty lies with the fact that the heat in the food receiving space or in the mixing vessel may not be uniformly distributed, in particular if a motor of a mixer in the mixing vessel does not rotate, or only slowly rotates, or the food filling level in the mixing vessel is too high. Basically, it is therefore a problem that the measured temperature (in particular in a mixing vessel), which is used for heating regulation in the domestic appliance, in particular of the food processor, deviates from the actual temperature of a medium in the receiving space or in the mixing vessel, respectively. Another problem is that the heat-up of the medium using the measured temperature occurs only unreliably and slowly.

It is therefore an object of the present invention to at least partially resolve the above-mentioned disadvantages. In particular, it is the object of the present invention to propose an improved adjustment of the heating power of a domestic appliance, and in particular of a food processor.

The above object is achieved by a method having the features of the independent method claim, a system having the features of the independent system claim, a domestic appliance having the features of the independent device claim, as well as by a computer program product having the features of the further independent device claim. Further features and details of the invention result from the respective sub-claims, the description and the drawings. In this case, features and details described in conjunction with the method according to the invention naturally also apply in conjunction with the system according to the invention, the domestic appliance according to the invention and the computer program product, and respectively vice versa, so that with respect the disclosure, reference is or can always be made reciprocally to the individual aspects of the invention.

The object is in particular achieved by a method for adjusting the heating power of at least one heating element, e.g. of a resistance heating, or of a thick film heating, or an inductive coil or the like, of a domestic appliance, in particular a food processor, wherein preferably the adjustment of the heating power for heating regulation is carried out. In the heating element, the heating power can e.g. be adjusted in that an electric energy supply to the heating element is regulated. In this way, a heat-up of the heating element or by means of the heating element can be effected, in order to heat a medium in a receiving space of the domestic appliance, in particular in a mixing vessel of the food processor. Here, the medium includes for example at least one food in the receiving space (in a pot of the food processor, for example).

In this case, it is in particular provided that the domestic appliance, in particular the food processor, is configured for the at least partially-automatic preparation of food, e.g. by means of a receiving space, in particular a mixing vessel or an oven chamber, for receiving the food and/or by a mixer for mixing the food and/or by the heating element for warming the food.

Furthermore, the domestic appliance, in particular the food processor, can comprise a temperature sensor for measuring a temperature at the receiving space, in particular the mixing vessel of the food processor. The temperature sensor and/or the heating element are integrated in a bottom for the receiving space, in particular in the bottom of the mixing vessel or a hotplate or a bottom of an oven, wherein the temperature sensor can, as the case may be, likewise be integrated in the heating element. For the automated preparation, a control device can be provided, for example, which, using a predetermined recipe or a user input, controls the mixer and/or the heating element.

Advantageously, at least one of the following steps can be performed in a method according to the invention, wherein the steps are preferably performed subsequently or in any order and/or iteratively and, as the case may be, individual steps can be repeated as well:

a) performing a heat-up stage with a heating power adjustment (of the heating element) such that the (measured) temperature (in particular as an actual temperature) aims toward a predetermined target temperature, in particular by means of a heating regulation, wherein the temperature is preferably measured regularly or cyclically, by means of the temperature sensor, b) performing a temperature-holding stage when the (actual) temperature reached the target temperature, wherein a limitation of the heating power is effected in the temperature-holding stage, c) performing at least one evaluation of the (actual) temperature using the target temperature, during the temperature-holding stage, so that an evaluation result is determined, d) performing the stabilization stage, if the evaluation result meets a stabilization criterion, wherein preferably, in the stabilization stage, the heating power adjustment is effected such that the (actual) temperature aims toward a certain stabilization temperature, wherein the stabilization temperature is higher than the target temperature.

In other words, the stabilization temperature can be a new target temperature with a higher temperature value than the originally-specified target temperature. In this way, a kind of overdrive of the heating power adjustment or heating regulation can occur. This comes with the advantage that by means of a simple and cost-effective control of the heating power regulation or heating regulation, the temperature of the medium can reach the desired temperature value faster. To that end, a temperature-dependent and/or time-dependent stability criterion can be set, which is, for example, identified by means of empiric data and/or is set by a user.

Particularly advantageous examples for such a stability criterion are also discussed hereinafter.

Furthermore, it is possible that the method according to the invention and/or the steps of the invention are performed iteratively, in particular during a preparation of food, in order to optimize the preparation thereby.

In particular, in this case, steps b), c) and d) are performed iteratively, preferably until the stabilization criterion is no longer met. When the stabilization criterion is no longer met (i.e., the evaluation result does no longer meet the stabilization criterion), a temperature-holding stage can be performed (again) according to another step e). A specific example for the stabilization criterion is explained in the following.

The domestic appliance can be configured as a food processor and/or as a household appliance and/or as a kitchen appliance and/or as a stove and/or as an oven or the like, and preferably comprise a receiving space, in which the food is prepared manually or automatedly. To this end, the food can be positioned, for example on the bottom of the receiving space. Therefore, also an electric device, e.g. a hotplate, possibly also for the use of an inductive heating, can be considered as a heating element. Accordingly, the receiving space can also be a space of a stove, a cooking chamber or a hotplate or a mixing vessel or the like.

It can be of particular advantage that the method according to the invention is understood as an intelligent method, which serves for the preparation, in particular cooking, of food through the domestic appliance, in particular the food processor. To this end, a difference can be determined between a measured temperature and the temperature of the media, and/or the food can quickly be heated until reaching the desired temperature by means of an iterative process. In particular, the term "medium" refers to the at least one food in the receiving space, in particular in the mixing vessel.

It is conceivable that upon cooking (in particular with a low motor speed of a mixer in a mixing vessel of a food processor and/or with a high filling level of the medium in the mixing vessel), a large temperature difference occurs between a measured temperature and an actual temperature of the medium. The reason for this lies with the fact that for construction-related reasons, a temperature sensor, in particular an NTC sensor (i.e., an NTC thermistor) is not able to measure directly in the medium, but is arranged only near the medium (e.g. in the bottom of a mixing vessel). Another reason can be that the heat is only slowly transferred to the entire medium. Conventionally, the heating regulation is carried out such that the heating with the heating element is only regulated with respect to the target temperature. This leads to long-persisting difference, i.e., there is only a slow approximation.

In particular, it has been found that this approximation is accelerated if the target temperature is increased for a short period of time. In other words, three stages can be used to perform an improved heating adaption: a heat-up (heat-up stage), a stabilization (i.e., a stabilizing stage) and a temperature-holding (i.e., a temperature-holding stage). At least one parameter can be defined for each of these heating stages i.e., a parametrization of the stages can be effected. In this way, a power limitation for heating power limitation can be defined for the temperature-holding stage B (e.g. with 40% or 80% of the highest power output, i.e., a maximum power output).

It can be provided that for each cooking process (i.e. for each preparation) in the domestic appliance, in particular the food processor, the heat-up stage is performed first. Here, the adjustment of the heating power, in particular a heating control, can be effected such that the measured temperature, as fast as possible, reaches the target temperature. Once the measured temperature reaches the target temperature, the heating power adjustment can proceed to the temperature-holding stage. The heating regulation can be effected with a limited maximum power output (e.g. 40% maximum or 80% maximum) according to the limitation of the heating power. In this case, temperature measuring continues and, for example, the lowest measured temperature is stored, and if a difference between the lowest temperature and the target temperature (e.g. the desired temperature) exceeds a threshold value, the heating power adjustment switches to the stabilization stage. A new target temperature (stabilization temperature) can be set for the stabilization stage.

In this case, it is conceivable that the heating power adjustment, in the stabilization stage, regulates the heating power in a manner to achieve this new target temperature, and, as the case may be, a timer runs. If, based on the timer, the exceeding of a time period, in particular of the stabilization time, is detected, the heating power adjustment can switch to the temperature-holding stage again. Just as well, a change-over to the stabilization period can occur if the measured temperature exceeds the new target temperature and/or the stabilization criterion is no longer met. These changes in the stages can occur automatically multiple times, if required.

In particular, it can be possible here that with the setting of a target temperature (for example by a user) to another value, the heat-up stage is started again. Likewise, the heat-up stage can be started again if a lowest measured temperature is below the target temperature at a predefined difference.

It can be of advantage if, in the scope of the invention, the stabilization temperature is determined using the evaluation result, wherein the stabilization temperature is preferably restricted by a maximum offset. In other words, the stabilization temperature can be variable, and depend on the target temperature and/or the measured temperature, for example. It can also be possible that for determining the stabilization temperature, a slope of a curve of measured temperature values of the measured temperature is considered. In addition, the use of a maximum offset as a maximum value for the stabilization temperature can increase the stability of the method according to the invention.

Just as well, it is optionally also conceivable that for limiting of the heating power, the heating power adjustment occurs such that the heating power is limited to a predetermined maximum holding heating power, wherein, in the heat-up stage, and/or the stabilization stage, the heating power adjustment, in particular in the form of a heating power regulation, occurs in such a way that the limiting of the heating power is deactivated, and thus, in particular the heating power maximally can correspond to the maximum heating power, and/or in the stabilization stage, the heating power adjustment is performed in such way that limiting the heating power is restricted to a value that is higher than in the temperature holding stage. Likewise, it can be possible that the heating power during the heat-up stage and/or the stabilization stage is limited to another threshold value. It can be decisive in this case that the heating power of the temperate-holding stage is lower than in the heat-up stage and/or the stabilization stage at all times. This allows an efficient and fast homogenization of the temperature in the medium.

Furthermore, it can be provided in the scope of the invention that in the heating power limitation, in particular for the temperature holding stage, the heating power is limited to a predetermined maximum holding heating power in the range of 10% to 90%, preferably 20% to 70%, preferably 30% to 60%, particularly preferably 40% to 50%, in particular 35% of a maximum heating power. The maximum heating power is, for example, a power output such that can maximally be provided by the heating regulation of the domestic appliance, in particular the food processor.

Preferably, it can be provided that in the temperature holding stage, one or multiple temperature values are determined by at least one temperature measurement, wherein in step c), the evaluation is effected in that a difference of the determined temperature value or of one of the determined temperature values, in particular of a minimum of the temperature values, and the target temperature is determined, wherein the difference preferably constitutes the evaluation result. Just as well, it can be possible that the comparison of the difference with a threshold value, which can for example be predefined, constitutes the evaluation result. It is furthermore of advantage if the minimum of the temperature values is determined from at least two or at least five or at least ten or at least 100 or at least 120 temperature values. This allows reliably performing the stabilization stage.

The operation of forming a minimum can e.g. be determined by all temperature values, that have been determined in a corresponding stage (in which the minimum is formed).

Advantageously, it can be provided in the scope of the invention that a temporal stabilization duration of the performing of the stabilization stage is determined, wherein the following step is provided after step d):

performing a changeover from the stabilization stage to the temperature holding stage, if the determined temporal stabilization duration exceeds a certain stabilization time specification.

The temporal stabilization duration can be determined using a timer (for example a respective electronic module for time determination), for example. The stabilization specification can, as the case may be, be present prestored, for example in an electronic storage unit. Both, the storage unit and the timer, can thereby be in a processing device, e.g. a microcontroller and/or an integrated circuit and/or electronics of the domestic appliance or of the food processor, respectively.

In the scope of the invention, another advantage can be achieved if, during the stabilization stage for temperature monitoring, at least one temperature value is determined by means of at least one measurement of the temperature, wherein after step d), the following step is provided:

performing a change-over from the stabilization stage to the temperature-holding stage, if, during the stabilization stage, an evaluation of the temperature value using the stabilization temperature meets a cancellation criterion, in particular if the temperature value indicates that the temperature reached the stabilization temperature.

In other words, it can be provided that either a stabilization time specification as a maximum duration, in particular stabilization time, of the performing of the stabilization stage is reached, or that the measured temperature reaches the stabilization temperature, so that the stabilization stage is canceled and a change to the temperature-holding stage is effected.

Advantageously, it can be provided in the invention that during the heat-up stage, multiple temperature values are identified by means of temperature measurements for temperature monitoring, so that an increase in temperature (in particular a long-term upward slope of a temperature curve determined from the temperature values) is determined, wherein for determining the stabilization time specification, a relationship according to the evaluation result identified in step c) is identified with the determined temperature increase, wherein the stabilization time specification preferably is limited by a maximum duration, which preferably is in the range of 100 sec to 1000 sec, preferably 200 sec to 800 sec. In this way, the stability of the method according to the invention can be increased.

Furthermore, it can be provided within the scope of the invention that during the stabilization stage, for the temperature monitoring at least one temperature value is identified by at least one measuring of the temperature, wherein after step d), the following step is provided:

performing a changeover from the stabilization stage to the heat-up stage, if during the stabilization stage, an assessment of a temperature value meets a heat-up criterion, in particular if a difference in temperature between the temperature value and the target temperature exceeds a predetermined threshold (e.g. Threshold_aufh).

Here, the temperature value for forming the difference in temperature can also be the minimum temperature value out of a row of different temperature values. This allows further improving the heat-up of the medium.

Furthermore, it can be provided that during the heat-up stage and/or during the temperature-holding stage, and/or during the stabilization stage, a temperature monitoring is performed such that multiple measurements of the temperature, performed by the temperature sensor successively, preferably at regular intervals, in order to respectively identify at least one temperature value, in order to in particular perform the evaluation according to step c), and/or to find out if the temperature has reached the target temperature and/or the stabilization temperature. As described above, advantageously also a minimum can be formed out of multiple temperate values, so that the smallest (minimum) temperature value is used for forming a difference.

Furthermore, it is optionally provided that the heat-up stage and/or the temperature-holding stage and/or the stabilization stage is performed during the preparation of food, in order to heat-up the food in the receiving space, in particular in the mixing vessel, to the target temperature, wherein the measured temperature is specific to the temperature of the food and deviates therefrom, wherein preferably the stabilization temperature and/or the stabilization duration (i.e. a time duration in which the stabilization period is performed) is determined such that, in the stabilization stage, a harmonization of the temperature of the food to the target temperature occurs at a higher speed than in the temperature-holding stage. To that end, the stabilization temperature is advantageously selected to be higher than the predetermined target temperature. For example, the stabilization temperature is selected to be higher than the predetermined target temperature by at least one K, or at least 2 K, or at least 5 K, or at least 10 K, or at most 20 K. This allows an efficient heat-up of the medium.

Furthermore, it can be provided in the scope of the invention that the stabilization criterion, in particular during step b) and/or during the temperature holding stage, is met, if the evaluation result, preferably a difference of an identified temperature value or of one of the identified temperature values, in particular of a minimum of the temperature values, exceeds a predefined threshold value (for example Threshold_stb), wherein preferably the threshold value is specified independent of the food and preferably, the threshold value is in the range of 1K to 10 K, preferably 2K to 9K, preferably 3K to 8K, particularly preferably 3.8 K to 7K, preferably at exactly 3.8 K. In this case, using a food-independent threshold value can achieve the advantage that the method according to the invention can be performed in the same way, and therefore simply and cost-efficiently.

Advantageously, the stabilization criterion can (in particular only) be met if the evaluation result exceeds a predefined threshold (e.g. Threshold_stb). The evaluation result is, for example, formed in that a difference or an amount of a difference between an identified temperature value or one of the identified temperature values, in particular a minimum of the temperature values and the target temperature is formed. In other words, the stabilization criterion can be met if the distance between the actual temperature and the target temperature becomes too large.

Optionally, it can be provided that the stabilization temperature is greater than the target temperature by an offset, wherein the offset is determined by the difference between the target temperature and at least one temperature value determined in the temperature holding stage, in particular a minimum of these temperature values, and in particular a maximum offset in the range of 8 K to 20 K, preferably 10 K to 15 K, preferably 12K to 14 K, in particular at least 5 K, particularly preferably 20K at maximum. In this way, a particular effective heat-up of the medium is possible.

The invention also relates to a system for adjusting the heating power in a domestic appliance, in particular a food processor, comprising:
  at least one temperature sensor for performing at least one measurement of a temperature in a receiving space of the domestic appliance, in particular in a mixing vessel of the domestic appliance,
  at least one control device for the control of at least one heating element of the domestic appliance, in particular of the food processor, depending on a heating power adjustment, so that in a heat-up stage, the temperature aims toward a predetermined target temperature, and in a temperature-holding stage, a limitation of the heating power occurs,
  at least one processing device for assessment of the temperature by means of a target temperature, at least in the temperature-holding stage, wherein the processing device preferably is configured to initiate a stabilization stage depending on the assessment, wherein in the stabilization stage, the heating power adjustment can be performed in such a way that the temperature aims toward a certain stabilization temperature, wherein the stabilization temperature is higher than the (predefined) target temperature.

In this way, the system according to the invention has the same advantages as have been described in detail with reference to a method according to the invention. In addition, a system according to the invention can be configured to be operable by a method according to the invention.

It is furthermore conceivable that the heating element is integrated in the receiving space, in particular in a wall of the receiving space, preferably in the mixing vessel, in particular as a resistance heating in a bottom of the receiving space, preferably in the bottom of the mixing vessel. Preferably, the heating element can be embedded, in planar fashion, in the bottom or in the mixing vessel bottom, so that a surface as large as possible can be used for the heat-up of the medium (in particular in the mixing vessel). In particular, the heating element can be heated by means of a flow of electric current in the heating element, by means of the heating regulation.

Furthermore, it is conceivable that the temperature sensor is configured as an NTC sensor, and is embedded with the receiving space, in particular in a wall of the receiving space, in particular in a mixing vessel. It can be possible for the temperature sensor to not come in direct contact with the medium (in particular in the mixing vessel). In this way, the service life of the temperature sensor and safety when operating the domestic appliance, in particular the food processor, is improved.

The scope of the invention also covers a domestic appliance, in particular a food processor, preferably for the (at least partially-automatic) preparation of at least one food, wherein a system according to the invention is provided in the domestic appliance or the food processor. In this way, the domestic appliance according to the invention comes with the same advantages as have been described in detail with respect to the system according to the invention.

The present invention also relates to a computer program product for adjusting the heating power in a domestic appliance, in particular a food processor. In this case, it is provided that the computer program product is configured, when executed by a processing device, to perform the following steps, in particular according to a method according to the invention:
  a) initiating a heat-up stage with a heating power adjustment such that a (measured) temperature in a receiving space of the domestic appliance, in particular a mixing vessel of the food processor, aims toward a predetermined target temperature,
  b) initiating a temperature-holding stage when the temperature reaches the target temperature, wherein a heating power adjustment is effected in the temperature-holding stage,
  c) performing at least one assessment of the temperature using the target temperature during the temperature-holding stage, so that an evaluation result is determined,
  d) initiating of a stabilization stage if the evaluation result meets a stabilization criterion, wherein, in the stabilization stage, the heating power adjustment occurs in such a way that the temperature aims toward a certain stabilization temperature, wherein the stabilization temperature is higher than the target temperature.

In this way, the computer program product comes with the same advantages that have been described in detail with respect to a method according to the invention.

Further advantages, features and details of the invention result from the following description, in which exemplary embodiments of the invention are described in detail with reference to the drawings. The features mentioned in the claims and in the description can each individually, or in any combination, be essential to the invention.

The Figures show in.

In the following Figures, the same technical features, even of different exemplary embodiments, are denoted by identical reference characters.

Figure 1:
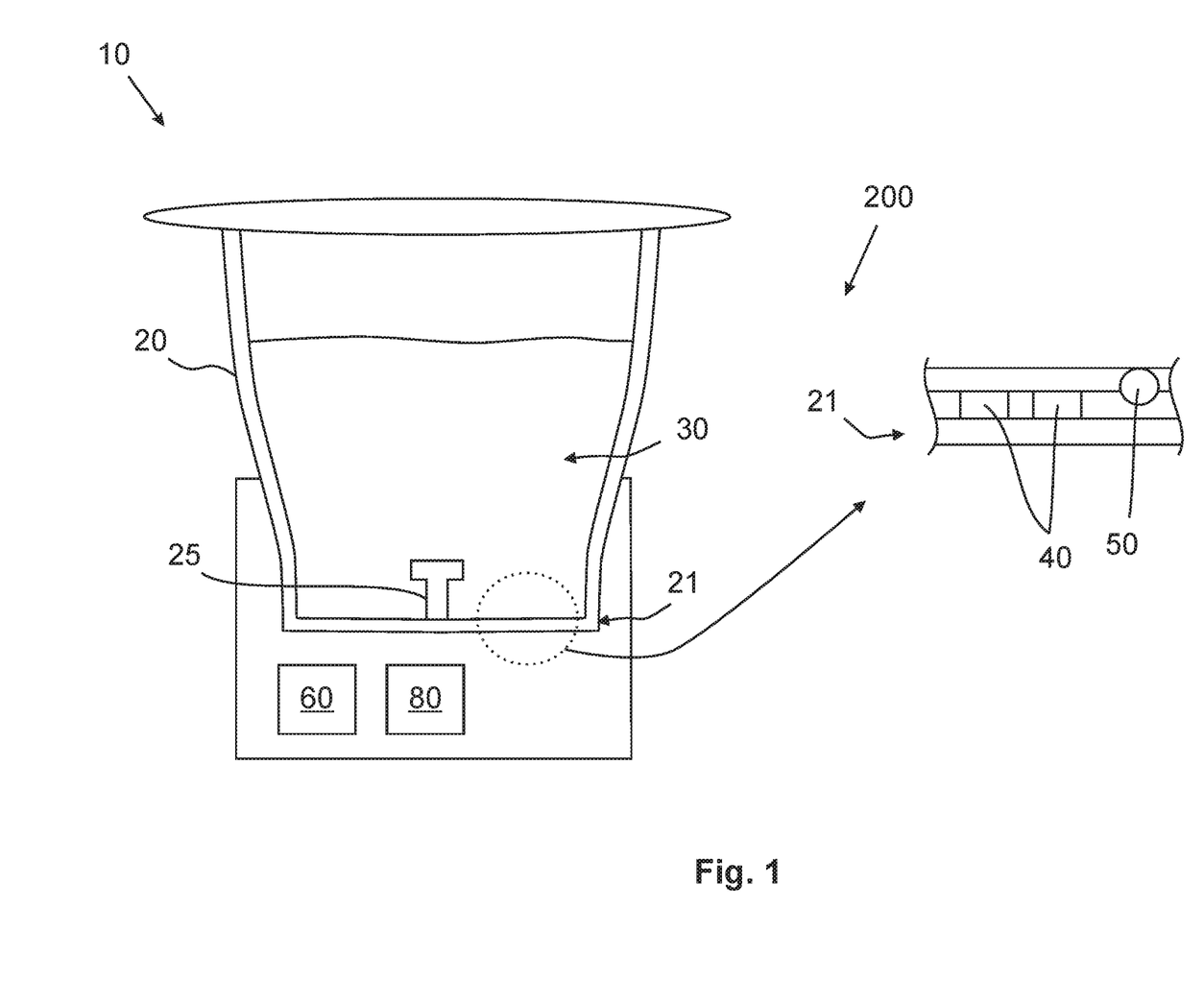
FIG. 1: a schematic illustration of a domestic appliance.

FIG. 1 schematically shows a domestic appliance 10 according to the invention, by way of example of a food processor 10 with a system 200 according to the invention. It can be seen here that a mixing vessel 20 is provided as a receiving space for food.

To that end, at least one food can be accommodated in the mixing vessel 20. The medium 30 present in the mixing vessel 20 is schematically illustrated with an exemplary filling level. At least one heating element 40 for the heat-up of the medium 30 can be provided in the food processor 10, and be operated by a heating regulation depending on a measured temperature T. For example, a control device 80 can be used for the heating regulation, which controls a transfer of electric energy to the heating element 40 for heating depending on measured temperature values. For the purpose of a better illustration of the heating element 40, a region of a mixing vessel bottom 21 emphasized by a dashed line is shown enlarged. The heating element 40 can be embedded in the mixing vessel bottom 21 in a planar fashion, in order to enable a uniform heat-up of the medium 30. Just as well, a temperature sensor 50, neighboring the heating element 40, can be embedded in the mixing vessel bottom 21 for measuring the actual temperature T, and therefore for detecting the temperature measuring values.

In the heating regulation, a deviation can occur (e.g. depending on the medium 30 and/or the filling level of the medium 30 and/or of the desired or the set temperature) between the measured actual temperature T and a real temperature of the medium 30, e.g. with respect to a location in the medium 30 farther away from the heating element 40. This is because the heat-up by the heating element 40 first of all has an effect on the region of the medium 30 directly adjacent the heating element 40, and thereafter, a more or less slow heat transfer occurs to regions of the medium 30 that are farther away. The operation of a mixer 25 in the mixing vessel 20 supports a heat transfer, through which operation a mixing of the medium 30 for preparing the food located therein is possible.

In order to further promote the uniform and quick heat-up of the entire medium 30, a method 100 according to the invention can at least in part be provided by means of an assessment of a processing device 60, as will be described in greater detail below.

Figure 2:
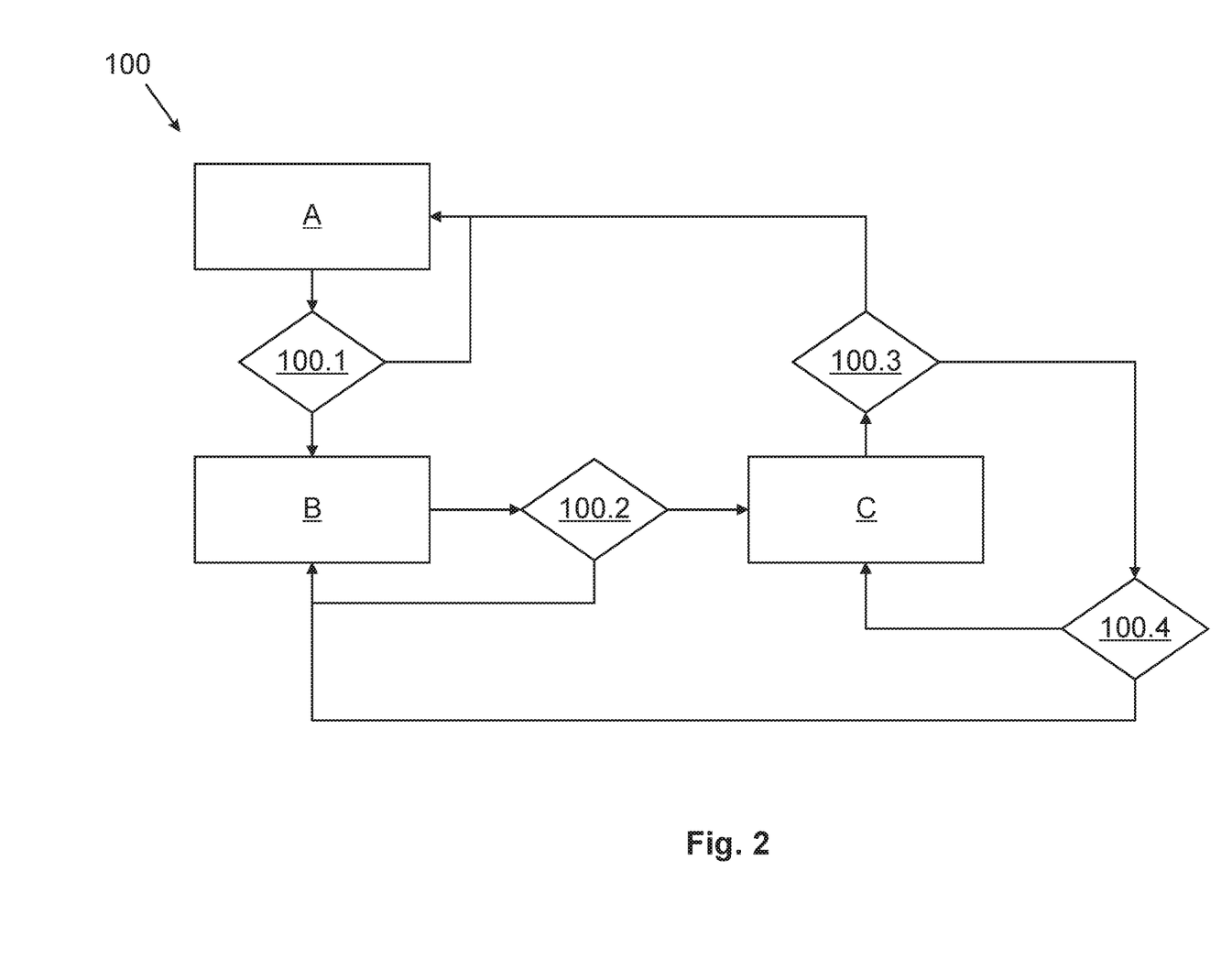
FIG. 2: a schematic block diagram for the illustration of a method according to the invention.

FIG. 2 schematically shows a flow of a method 100 according to the invention. For example, the method 100 is initiated, if a user of the domestic appliance 10, respectively of the food processor 10, wants the food to be heated, and accordingly sets a target temperature S for the medium 30. In this case, first of all, a heat-up stage A is performed with a heating power adjustment of the heating element 40 in such a way that the temperature T measured by the temperature sensor 50 (actual temperature T) aims toward the predefined target temperature S. The heating power adjustment is, for example, made available by a transfer of electric energy to the heating element 40, e.g. by a control device 80, wherein the electric output transferred to the heating element 40 is adjusted depending on the temperature T. If, at this time, a medium 30 should be located in the receiving space 20, in particular in the mixing vessel 20, which is in indirect contact with the heating element 40 via the bottom 21, in particular mixing vessel bottom 21, a heat transfer can occur from the heating element 40 to the medium 30. To that end, the bottom 21 can at least in part be formed of a heat-conductive material, such as a metal, for example. It goes without saying that a deviation occurs between the real temperature of the medium 30 and the measured actual temperature T, because the heat-up of the medium 30 usually requires time. Therefore, further steps are performed in order to reduce this duration as far as possible, and thereby enable an improved preparation of the food in the medium.

It can be checked in the subsequent step 100.1 if the measured actual temperature T has reached the target temperature S. If not, the heat-up stage A continues. If yes, a temperature-holding stage B is performed, wherein in the temperature-holding stage B, the heating power is limited. In other words, a heating with limited power (e.g. at most up to a maximum holding heating power) occurs, so that a time period for homogenization of the temperature in the medium is provided. The maximum holding heating power can be set depending on a maximum heating power.

Furthermore, a measuring of the temperature T can be effected during the temperature-holding stage B. Also, a minimum can be formed out of multiple measured temperature values T (i.e. the smallest measured temperature value can be identified).

In a further step 100.2, it is preferably checked if a difference of the minimum (i.e., the smallest temperature T measured) and the target temperature S is still below a threshold value. In other words, the following verification is carried out:

$$\min(Tbowl) - Ttarget < Threshold\_stb.$$

Here, Tbowl is the measured temperature T, min is the minimum, Ttarget is the predetermined target temperature S and Threshold_stb is the predefined threshold value. In this way, an evaluation of the temperature T is performed using the target temperature S and during the temperature-holding stage B, so that an evaluation result is determined. If the result of the check (i.e. the comparison) is positive (i.e. the difference or the amount of the difference is below the threshold value), i.e. the evaluation result not meeting a stabilization criterion, the temperature-holding stage B continues. Otherwise, the stabilization criterion is met, and a stabilization stage C is performed.

In the stabilization stage C, the heating power adjustment occurs in particular such that the temperature T aims toward a certain stabilization temperature ST, wherein the stabilization temperature ST is higher than the target temperature S. In other words, an intended override of the target temperature S is performed in the stabilization stage C, in order to allow for a better heat-up of the medium.

In a further step 100.3, it can then optionally be checked if a minimum of the measured temperature T subtracted with the target temperature S is above a further threshold value. In other words, the following verification carried out:

$$\min(Tbowl) - Ttarget > Threshold\_aufh,$$

where Threshold_aufh is the further threshold value, which depends on the stabilization temperature ST. If this verification is positive, i.e. the threshold value is exceeded, the heating power adjustment changes to the heat-up stage A. Otherwise (or alternatively), another verification can be carried out according to step 100.4:

$$Tbowl > Ttarget, new \text{ OR } TIMER > Time\_check,$$

Here, TIMER is the output of a timer and indicates the duration of the performing of the stabilization stage C. Time_check is a time-related threshold value. In other words, if the duration of the stabilization stage C exceeds a maximum value, or if the temperature T exceeds a "new" target temperature Ttarget, new, the result of this check is positive. In this case, it is again changed to the temperature-holding stage B. Otherwise, stabilization stage C is continued. The new target temperature Ttarget, new is in particular the stabilization temperature ST in this case.

The values Time_check and Ttarget, new are, as the case may be, calculated in the stabilization stage C. Time_check can for example be calculated by:

$$Time\_check = (Ttarget - \min(Tbowl))/dTbowl, longterm,$$

wherein dTbowl, long-term is a long-term gradient slope (long term slope) for the measured temperature T. This can for example be identified by means of a course of measured temperature values of the measured temperature T, e.g. by forming a difference of the measured values and/or by an interpolation or the like.

Subsequently, Time_check can be compared with a predetermined maximum value for Time_check, and in case of exceeding, the maximum value can be set for Time_check.

Furthermore, it can be provided that the stabilization temperature ST is higher, by an offset, than the target temperature S, wherein the offset is determined by the difference between the target temperature S and at least one of the temperature values determined in the temperature-holding stage B, in particular by means of a minimum of these temperature values. For determining the stabilization temperature ST, first the value "Time_check" i.e. the predetermined maximum duration of the stabilization stage C, can be multiplied by dTbowl, longterm. This value can be added to the predetermined target temperature S (or Ttarget, respectively). This sum can then, as the case may be, be restricted to a maximum value and forms the stabilization temperature ST (Ttarget, new) then.

Figure 3:
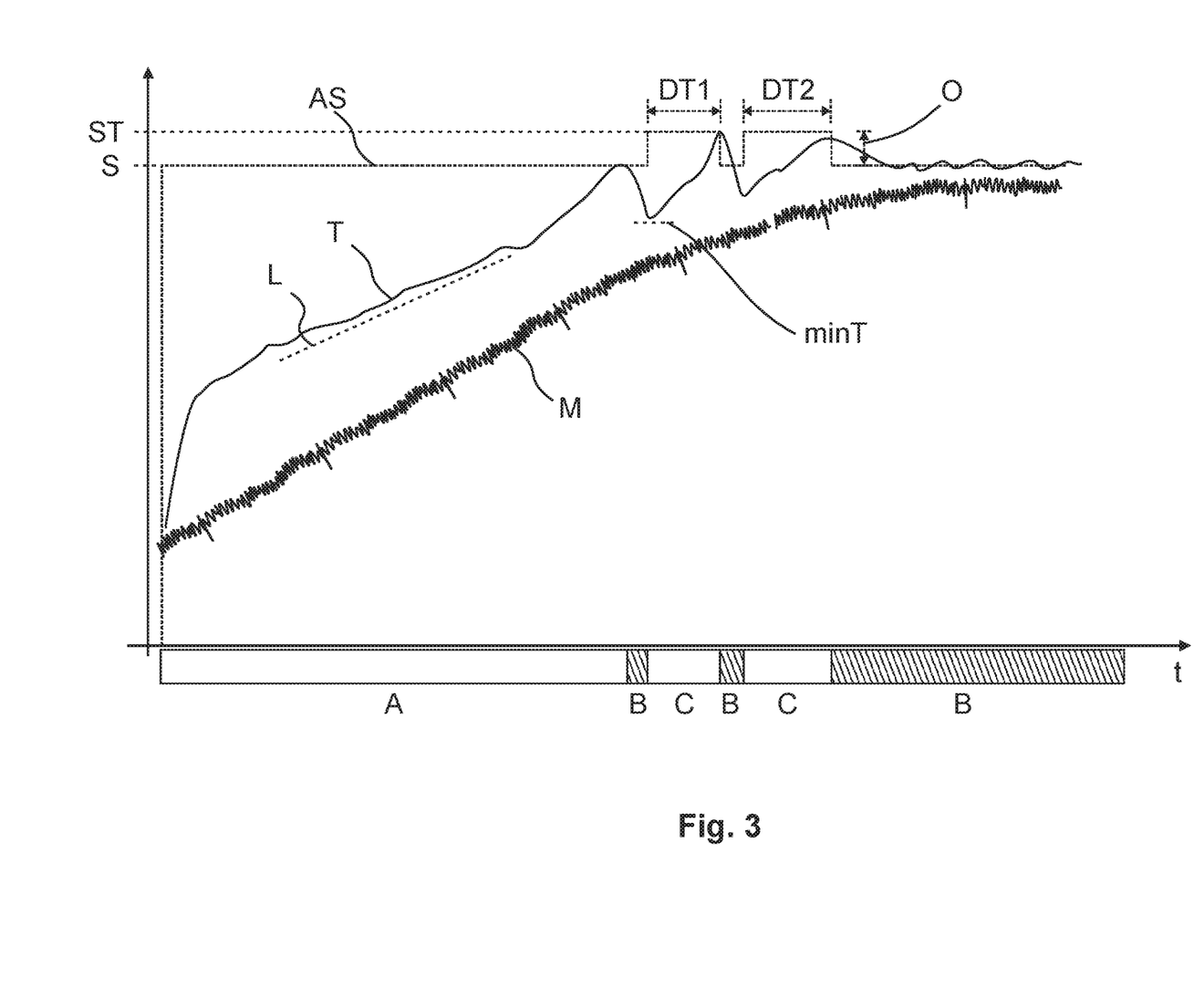
FIG. 3: a schematic measuring curve for the illustration of a method according to the invention.

FIG. 3 schematically illustrates a flow of a method 100 according to the invention by means of exemplary measured values, over the time t. Shown is a curve of measured values for a temperature T measured by a temperature sensor 50 and compared to a course of a real temperature (not measurable directly under real-life conditions) of a medium 30 (temperature of medium M). For detecting the temperature of the medium M, an external sensor can be used, for example. For example, a long-term slope L can be calculated from the measured values for the measured temperature T, which may then correspond to the value dTbowl, long-term. The long-term slope L is for example the slope of the illustrated curve of the measured temperature T over a time period of 0.5 sec to 200 sec, preferably 1 sec to 100 sec, preferably 60 sec. Here, the curve includes multiple measured values of temperature T.

First, a heat-up stage A for heating the medium 30 is performed. In said stage, a predetermined target temperature S can be used for heating regulation, wherein preferably the regulating parameter used to that end is the temperature T measured by the temperature sensor 50, and therefore, a temperature value for the temperature T forms the actual value, which can be compared to the target temperature S as the current target temperature AS. First, the temperature T aims toward the target temperature S. If the temperature T has reached the target temperature S, the medium temperature M can nevertheless be below the target temperature S, as can be taken from FIG. 3. In order to reduce this difference as quickly as possible, further stages can be performed. First, this can be the temperature-holding stage B, in which the heating power is limited. A minimum of the temperature value, minT can be identified in this stage, e.g. a minimum of a total of all temperature values measured in this stage to determine an evaluation result, by a comparison with a threshold value. Depending on the evaluation result, a stabilization stage C can then be carried out, if the evaluation result meets a stabilization criterion, wherein in the stabilization stage C, the heating power adjustment occurs in such a way that the temperature T aims toward a certain stabilization temperature ST, with the stabilization temperature ST being greater than the target temperature S.

Accordingly, the current target temperature AS used for heating regulation can, in the heat-up stage, first correspond to the predetermined target temperature S and in the stabilization stage C, correspond to the stabilization temperature ST. In order to form the stabilization temperature ST, the predetermined target temperature S can be increased by an offset O. It is furthermore illustrated that the stabilization stages C can also have a different duration (stabilization period or duration of stabilization time) DT1 and DT2. This means that a first stabilization stage C is ended, because the stabilization temperature ST is reached, and the second stabilization stage C is ended because the duration DT2 exceeds a maximum duration.

The above explanation of the embodiments describes the present invention exclusively by way of examples. It goes without saying that individual features of the embodiments, as long as technically useful, can be freely combined with one another without departing from the scope of the present invention.

LIST OF REFERENCE CHARACTERS

10 food processor
20 receiving space, mixing vessel
21 bottom, mixing vessel bottom
25 mixer
30 medium
40 heating element
50 temperature sensor
60 processing device
80 control device
100 method
200 system
minT minimum temperature value
A heat-up stage
AS current target temperature
B temperature-holding stage
C stabilization stage
L long-term increase
M medium temperature
O offset
S predetermined target temperature
ST stabilization temperature
T temperature, actual temperature
DT1 first stabilization duration
DT2 second stabilization duration

The invention claimed is:

1. Method for adjusting a heating power of at least one heating element of a domestic appliance, for the at least partially-automatic preparation of food, wherein the domestic appliance includes a temperature sensor for measuring a temperature in a receiving space of the domestic appliance, wherein the following steps are provided:
   a) performing a heat-up stage with a heating power adjustment such that the temperature aims toward a predetermined target temperature,
   b) performing a temperature-holding stage when the temperature reached the target temperature, wherein a limitation of the heating power is effected in the temperature-holding stage,
   c) performing at least one evaluation of the temperature using the target temperature during the temperature-holding stage, so that an evaluation result is determined, and
   d) performing a stabilization stage if the evaluation result meets a stabilization criterion, wherein in the stabilization stage, the heating power adjustment is effected such that the temperature aims toward a certain stabilization temperature, wherein the stabilization temperature is higher than the target temperature, wherein a temporal stabilization duration of the performing of the stabilization stage is determined during the stabilization stage, wherein the following step is provided after step d):

performing a changeover from the stabilization stage to the temperature-holding stage, when the determined temporal stabilization duration exceeds a certain stabilization time specification.

2. Method according to claim 1,
wherein the stabilization temperature is determined using the evaluation result.

3. Method according to claim 1,
wherein for the limitation of the heating power, the heating power adjustment is effect such that the heating power is limited to a predetermined maximum holding heating power, wherein, in at least in the heat-up stage, or the stabilization stage, the heating power adjustment, is effected in such a way that the limitation of the heating power is deactivated, or, in the stabilization stage, the heating power adjustment is effected in such a way that the limitation of the heating power is restricted to a value higher than in the temperature holding stage.

4. Method according to claim 1,
wherein in the heating power limitation, for the temperature holding stage, the heating power is limited to a predetermined maximum holding heating power in the range of 10% to 90% of at least a maximum heating power or in the temperature-holding stage one or multiple temperature values are determined by at least one measurement of the temperature, wherein in step c), the evaluation is effected in that a difference of the determined temperature value or of one of the determined temperature values, and of the target temperature is determined.

5. Method according to claim 1,
wherein during the stabilization stage, at least one temperature value is determined by means of at least one measurement of the temperature for the temperature monitoring, wherein the following step is provided after step d):

performing a change from the stabilization stage to the temperature-holding stage, if, during the stabilization stage, an evaluation of the temperature value using the stabilization temperature meets a cancellation criterion.

6. Method according to claim 1,
wherein during the heat-up stage, multiple temperature values are identified by means of measurements of the temperature for temperature monitoring, so that an increase in temperature is identified, wherein for determining the stabilization time specification, a relation between the evaluation result determined according to step c) and the identified temperature increase is determined.

7. Method according to claim 1,
wherein during the stabilization stage for temperature monitoring, at least one temperature value is determined by means of at least one measurement of the temperature, wherein after step d), the following step is provided:

performing a change from the stabilization stage to the heat-up stage, if during the stabilization stage, an evaluation of the temperature value meets a heat-up criterion.

8. Method according to claim 1,
wherein during at least one of the heat-up stage, the temperature-holding stage or the stabilization stage, a temperature monitoring is performed such that multiple measurements of the temperature are performed by the temperature sensor temporally in succession, in order to respectively identify at least one temperature value, in order to, perform at least one of the evaluation according to step c), or to find out if the temperature has reached at least one of the target temperature or the stabilization temperature.

9. Method according to claim 1,
wherein at least one of the heat-up stage, the temperature-holding stage or the stabilization stage is performed during the preparation of a food, in order to heat the food in the receiving space to the target temperature, wherein the measured temperature is specific for the temperature of the food and deviates therefrom.

10. Method according to claim 1,
wherein at least one of the stabilization criterion is met, if the evaluation result, exceeds a predefined threshold value, or that the stabilization temperature is higher, by an offset, than the target temperature, wherein the offset is determined between the difference between the target temperature and at least one temperature value identified in the temperature-holding stage.

11. Method according to claim 2,
wherein the stabilization temperature is preferably restricted by a maximum offset.

12. Method according to claim 9,
wherein at least one of the stabilization temperature or a stabilization duration is determined such that in the stabilization stage, an approximation of the temperature of the food to the target temperature occurs at a higher speed than in the temperature-holding stage.

13. Method according to claim 10,
wherein a difference of an identified temperature value or of one of the identified temperature values exceeds a predefined threshold value.

14. Method according to claim 10,
wherein a difference of a minimum of the temperature values and of the target temperature, exceeds a predefined threshold value.

15. Method according to claim 10,
wherein the threshold value is set food-independently.

16. Method for adjusting a heating power of at least one heating element of a domestic appliance, for the at least partially-automatic preparation of food, wherein the domestic appliance includes a temperature sensor for measuring a temperature in a receiving space of the domestic appliance, wherein the following steps are provided:

a) performing a heat-up stage with a heating power adjustment such that the temperature aims toward a predetermined target temperature, b) performing a temperature-holding stage when the temperature reached the target temperature, wherein a limitation of the heating power is effected in the temperature-holding stage, c) performing at least one evaluation of the temperature using the target temperature during the temperature-holding stage, so that an evaluation result is determined, and d) performing a stabilization stage if the evaluation result meets a stabilization criterion, wherein in the stabilization stage, the heating power adjustment is effected such that the temperature aims toward a certain stabilization temperature, wherein the stabilization temperature is higher than the target temperature, wherein during the stabilization stage for temperature monitoring, at least one temperature value is determined by means of at least one measurement of the temperature, wherein after step d), the following step is provided:

performing a change from the stabilization stage to the heat-up stage, if during the stabilization stage, an evaluation of the temperature value meets a heat-up criterion, wherein the heat-up criterion is met if a difference in temperature between the temperature and the target temperature exceeds a predetermined threshold.

* * * * *